United States Patent [19]

Haverdink

[11] 4,044,837
[45] Aug. 30, 1977

[54] CLEANER FOR ROOT CROP HARVESTER CONVEYOR

[75] Inventor: Virgil Dean Haverdink, Ankeny, Iowa

[73] Assignee: Deere & Company, Moline, Ill.

[21] Appl. No.: 662,581

[22] Filed: Mar. 1, 1976

[51] Int. Cl.² .................. A01D 19/00; A01D 25/00
[52] U.S. Cl. ..................... 171/58; 171/129; 198/803
[58] Field of Search .............. 171/58, 23, 116, 128, 171/129; 198/211

[56] References Cited

U.S. PATENT DOCUMENTS 3,863,428  2/1975  Baxter ........................... 56/30

FOREIGN PATENT DOCUMENTS 263,436  7/1968  Australia ........................ 171/129

OTHER PUBLICATIONS

Kleine Rodelader Amby RA 66 P2.

Primary Examiner—Russell R. Kinsey

[57] ABSTRACT

A conveyor cleaning mechanism is provided for a root crop harvester utilizing an annular root elevating conveyor. Rotatable stripper wheels project between circular rib members which comprise the root elevating conveyor and eject roots, rocks, mud and foreign materials wedged therebetween.

8 Claims, 3 Drawing Figures

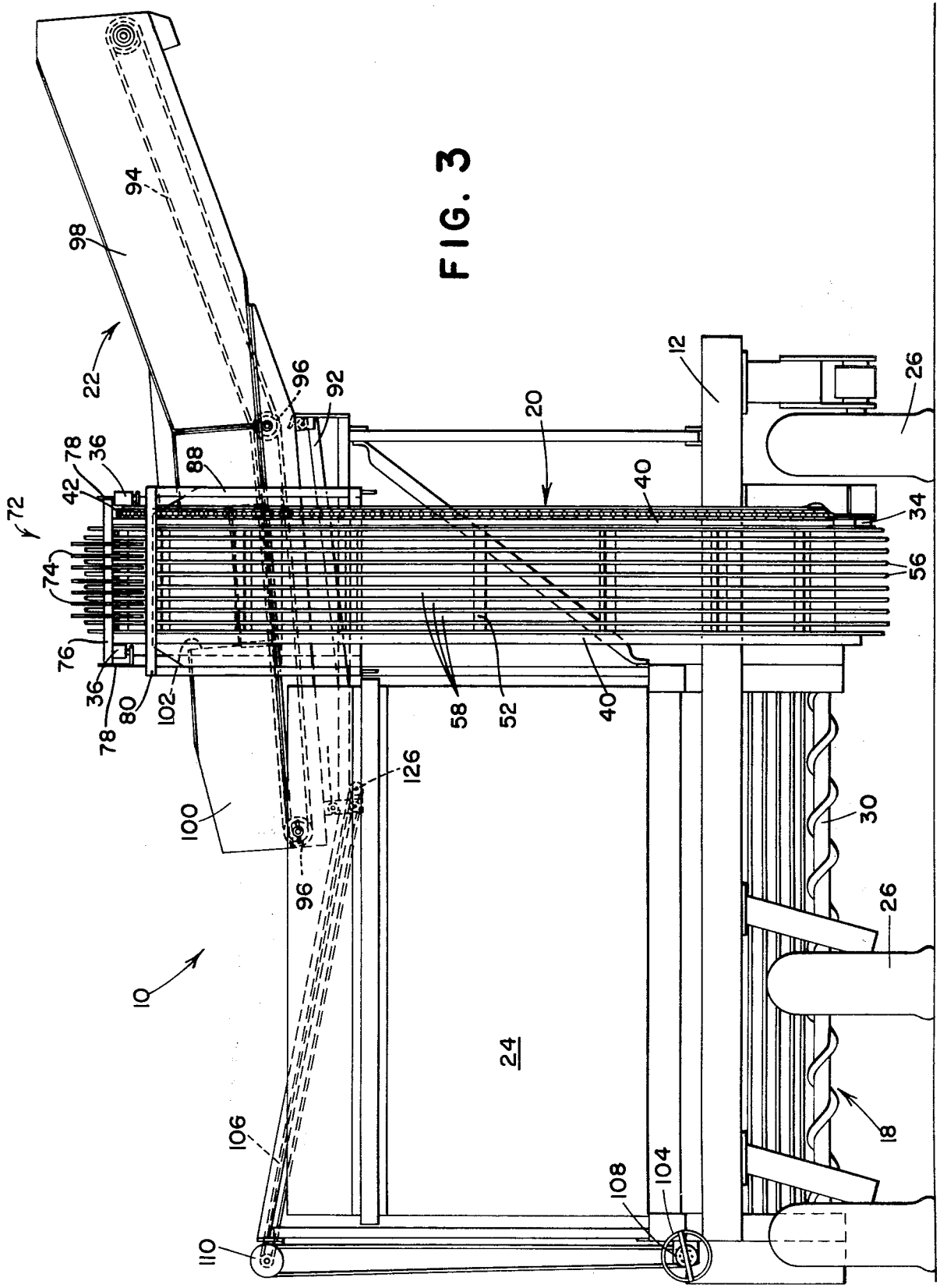

CLEANER FOR ROOT CROP HARVESTER CONVEYOR

BACKGROUND OF THE INVENTION

The present invention relates generally to agricultural harvesting equipment and more particularly relates to harvesters for root crops such as sugar beets.

When root crops such as sugar beets are harvested, dirt often clings to the root surfaces, particularly when wet or moist ground conditions are encountered during the harvest. To remove the dirt, it has been customary to pass the roots over roll-type cleaning conveyors which in addition to conveying the roots also tumble the roots providing a scrubbing action thereto. Nevertheless, roots harvested during muddy soil conditions often pass over the rolls with enough mud clinging to them to result in a mud buildup around the rolls.

To provide a compact and easily transportable beet harvester, vertical auger conveyors have replaced bulky and wide chain conveyors to elevate the beets or roots from the root cleaning conveyors to a position where they can be conveyed to a truck or trailer moving alongside the harvester. Should the conveyor rolls deliver muddy beets to these auger conveyors, the auger as well as the conveyor rolls after become impacted with mud buildup. Consequently, both of these mechanisms often become ineffective or overly aggressive and thereby damage or crush the beets.

An additional problem frequently encountered occurs when harvesting conditions expose the beet harvester to rocks and other foreign materials intermixed with the beets. Usually the conveying rolls and grab rolls are placed sufficiently far apart to permit loosened soil, small rocks and other foreign material to pass therealong. However, when rocky soil conditions are encountered, rocks conveyed with the beets to the elevating auger may, if of a certain size, become wedged or jammed between the conveyor rolls or auger and its housing, thereby resulting in significant damage to the harvester with accompanying lost or downtime.

SUMMARY OF THE INVENTION

In accordance with the foregoing problems, applicant has provided in the present invention a compact, easily transportable beet harvester having an upright annular elevator capable of effectively elevating mud-laden roots. Additionally provided is a means for ejecting the roots and foreign material from the elevator and onto a laterally extending discharge conveyor whereby both roots and foreign materials are delivered to an outer deposit area or adjacent storage tank.

More specifically, applicant has provided a beet harvester wherein the conveying structures are designed to convey mud-laden roots intermixed with some foreign materials such as rocks.

To this end, the annular elevator is designed to elevate mud-laden roots along with rocks and other foreign materials without causing damage to the mechanism or the beets. A stripper mechanism is provided to eject the elevated beets, rocks and foreign material from the annular elevator and clean the mud from the wheel elevator and its beet retaining baskets to prevent the elevator from becoming ineffective or overly agressive.

BRIEF DESCRIPTION OF THE DRAWINGS

FIG. 3 is a rear view of the harvester with the lateral conveyor extended for loading beets onto a truck.

DESCRIPTION OF THE PREFERRED EMBODIMENT

Figure 1:
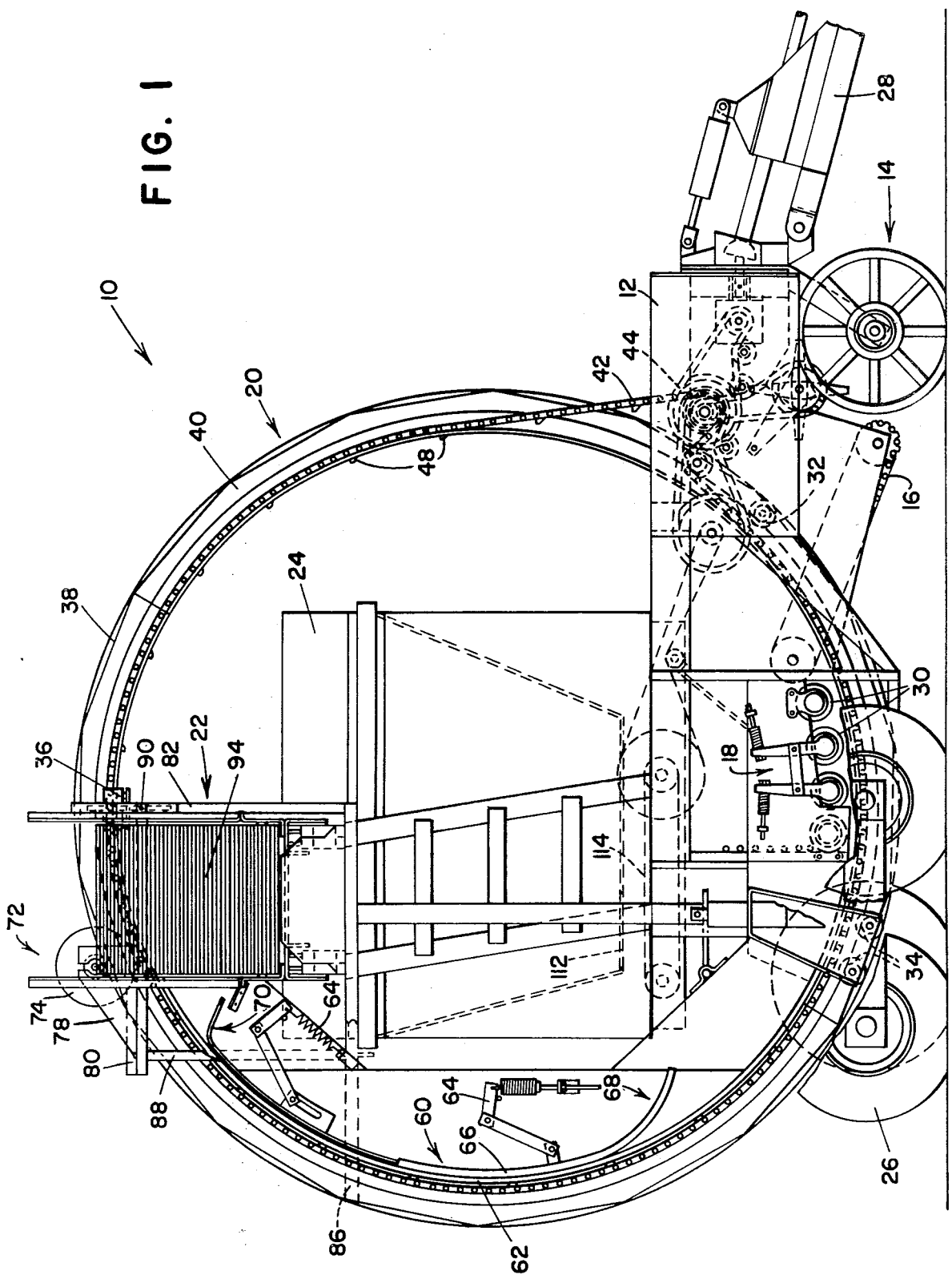
FIG. 1 is a side view of the harvester embodying the invention.

Referring now to the drawings and in particular FIG. 1, the beet harvester illustrated therein is indicated generally by the numeral 10 and includes a mobile frame 12, a root digging means 14, rearwardly extending first conveyor means 16, laterally extending second conveyor means 18, an annular elevator means 20, an elevated reversible conveyor means 22 and a root storage tank 24.

The frame 12 is supported on wheels 26 and includes a hitch 28 or suitable means for attachment to a tractor or similar power source. A plurality of digger wheel assemblies 14 are secured across the forward end of the frame 12 in a spaced relation to each other and each includes a pair of lifter wheels.

A first conveyor means 16 is carried directly behind the digger wheel assemblies 14 to receive beets from the digger wheel assemblies 14 and convey the same upwardly and rearwardly.

A second conveyor means designated generally 18 and carried by the frame 12 directly rearwardly of the first conveyor means 16 receives roots from the first conveyor means 16 for movement laterally. The second conveyor means 18 includes a plurality of powered elongated rolls 30 mounted in parallel relation. The rolls 30 are placed sufficiently close together to prevent roots deposited thereon from passing therebetween and each roll 30 is driven in a direction opposite of the roll 30 adjacent to it. At the discharge ends of the conveyor rolls 30 is a partially enclosed root-receiving area wherein conveyed roots accumulate and are directed into the annular elevator means 20 passing therebeneath.

Supporting the annular elevator means 20 for rotation about a horizontally transverse axis are roller means including support wheels 32 and 34 positioned respectively forwardly and rearwardly of the axis of rotation. Each support wheel 32 and 34 is suspended from the frame 12 and supports the annular elevator means 20 along its right side as viewed in FIG. 3. Also included in the roller means are stabilizing wheels 36 placed at the top lateral edges of the annular elevator means 20 to maintain it in its vertical plane of rotation.

Figure 2:
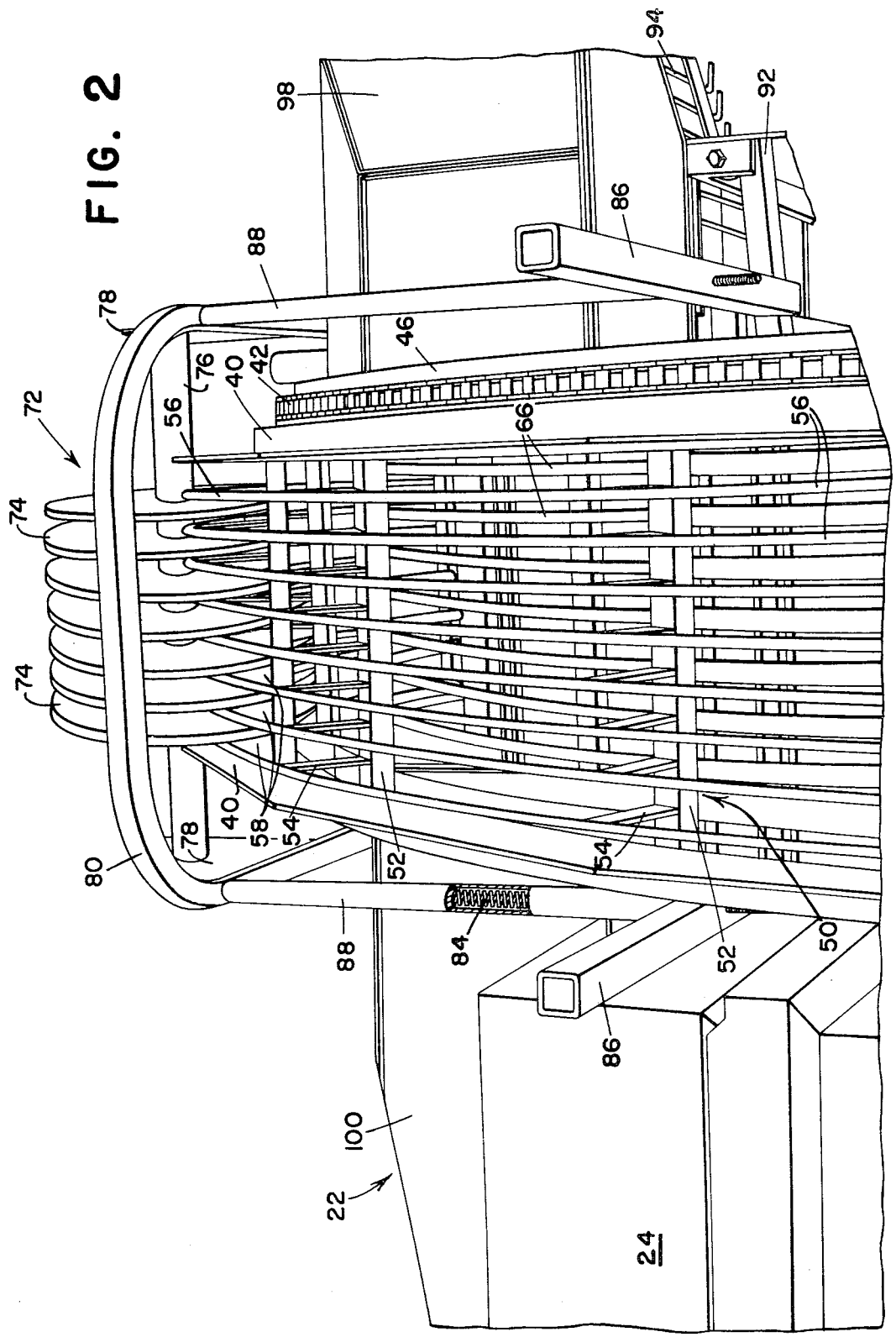
FIG. 2 is an expanded sectional perspective of the stripper means projecting into the annular elevator rib openings.

The annular elevator means 20 includes a large wheel member 38 comprised of a pair of substantially identical circular rim sections 40 coaxially positioned in parallel planar relation. The wheel 38 is rotated by a chain 42 driven by the harvester power train 44. The chain 42 is trained around a shelf 46 provided on one of the wheel's rim sections 40 and includes spaced apart teeth 48 which engage the shelf 46 through openings in the shelf 46 to prevent slippage between the chain 42 and wheel 38. Spaced interiorly to and peripherally around the wheel member 38 between the rims 40 are basket means 50 wherein deposited roots accummulate to be elevated and discharged onto the laterally extending and elevated reversible cross conveyor 22. As is best illustrated in FIG. 2, each basket means 50 is formed by cross members 52 secured at their ends between rim sections 40 and along their outer edges to radially extending bar members 54. The bar members 54 are in turn secured to circularly extending endless ribs 56 which form rings coaxially positioned in parallel and spaced apart planar relation between the rim sections 40. Formed between the ribs 56 and bar members 54 and extending peripherally around the wheel 38 are parallel slotted openings 58 through which dirt, small rocks and other foreign material can pass as the roots are conveyed.

In operation, the roots, often having been conveyed axially along the second conveyor rolls 30 to their discharge ends, will begin to tumble rearwardly into the basket means 50 passing below. As best shown in U.S. Pat. No. 4,024,920 issued May 24, 1977, each conveyor roll 30 is supported by means laterally spaced from the root-receiving area to minimize the opportunity for mud to accumulate around the bearings and cause bearing failures.

To retain the roots in the basket means 50 as the wheel 38 is rotated and the roots are elevated, a retaining means 60 is provided (see FIG. 1). This retaining means 60 is interiorly contiguous with the wheel 38 and forms therewith a passage 62 wherein roots are contained as they are elevated. The retaining means 60 is supported by the frame 12 on resiliently mounted supports 64 to permit it to yield when an excessive accumulation of roots or rocks are contained in a basket means 50 or when foreign materials have been conveyed to the basket means 50 and wedge between the wheel 38 and retaining means 60.

The structure of the retaining means 60 is similar to the wheel structure in that it is also constructed of parallel spaced rib members 66 joined by cross members (not shown). Each end of the arcuately shaped retaining means 60 extends inwardly from the periphery of the wheel 38, the lower end 68 serving as a funnel for incoming roots and the upper or exit end 70 serving as a discharge chute for directing roots onto the receiving conveyor 22.

To eject rocks, mud, foreign material and roots wedged between the wheel ribs 56 or from the basket means 50 and onto the reversible conveyor 22, a stripper means 72 is provided. The stripper means 72 includes a plurality of rigid or resiliently flexible stripper wheels 74 rotatably carried by a horizontal shaft 76 supported on mounts 78. Each stripper wheel or disk 74 projects between adjacent ribs 56 to push wedged materials therefrom. The mounts 78 are secured to a U-shaped frame 80 that is in turn pivotally secured at its forward end to rigid and upstanding frame members 82. The frame 80 is attached at its rearward end to a biasing means or springs 84 secured at their lower ends with horizontal and rigid frame members 86. The springs 84 are placed interior to the vertical sleeves 88 which abut with and act to limit the downward vertical movement of the U-shaped frame 80, but permit upwardly vertical movement of the frame 80 about its forwardly pivotal connection 90. This biasing arrangement permits the stripper wheels 74 and their U-shaped frame 80 to yieldably swing upwardly about the forward pivotal connections 90 of the frame as roots or other materials wedged between the wheel ribs 56 fail to become loosened.

The reversible conveyor 22 is supported on the frame 12 and disposed in underlying and root-receiving relationship to the annular elevator means 20. It is supported on a pair of fore-and-aft spaced and laterally extending support rails 92 secured with the frame 12. The rails 92 extend through the wheel member 38 and are inclined upwardly at their outer ends. The reversible conveyor 22 includes an elongated endless conveyor 94 supported by two rollers 96 which support conveyor wall sections 98 and 100, said walls inclined with respect to each other at their joint. Each wall section 98 and 100 includes identical front and rear members which serve to contain the roots being conveyed therebetween on the endless conveyor 94. An opening 102 in the rearwardly wall section is provided to permit elevated roots to pass onto the reversible conveyor 22 from the annular elevator means 20.

The reversible conveyor 22 is shiftable between a first retracted storage position and a second extended operating position as illustrated in FIG. 3. To move the conveyor 22 between these two positions, a manually operated chain and sprocket winch having a crank 104 is rotated to move the conveyor secured chain 106 trained over sprockets 108 and 110. Because the chain 106 is secured to the conveyor frame section 100 and the sprockets 108 and 110 are secured to the implement frame 12, the conveyor 22 will be shifted laterally as the crank 104 is rotated. To secure the conveyor 22 in either of its positions, lock means including a suitable pin are inserted into the crank 104 and frame member 12 forward of it. A hydraulic motor (not shown) reversibly powers the endless conveyor 22 to move roots either inwardly to the storage tank 24 or outwardly to a truck following alongside the harvester. Because both the rails 92 and reversible conveyor walls 98 and 100 are inclined when extended, trucks having a higher side bed clearance can be utilized to haul harvested roots from the fields.

When no truck is available to receive roots from the harvester, the roots can be deposited in the storage tank 24. The root storage tank 24 is provided with means for discharging stored roots onto the powered second conveyor means 18 for subsequent delivery to an available truck. The tank 24 includes an opening 112 in the bottom and a conveyor 114 which can move stored roots forwardly for discharge onto the second conveyor means 18 for movement laterally to the annular elevator means 20. Elevated roots are then deposited onto the reversible conveyor 22 and moved to the waiting truck.

In operation the digging means 14 are operative to lift the roots from the ground and move them rearwardly to the first conveyor means designated generally by the number 16. The roots are then conveyed upwardly and rearwardly to the laterally extending second conveyor means 18. The roots are then conveyed axially along the rolls 30 and drop off into the basket means 50 passing below.

As the roots fall into the basket means 50, they group against the bar members 54. Should too many roots accumulate in a particular basket means 50, the lower end 68 of the retaining means 60 will deflect some roots into the next basket means 50. Should too many roots nevertheless enter the passage 62, the retaining means 60 will yield, moving forwardly to permit the roots to pass upwardly. When rocks or other foreign materials are conveyed in the basket means 50, the retaining means 60 will yield before damage is caused to the retaining rib members 66 or wheel rotation prevented. As roots are elevated, they are retained within their respective basket means 50 until they reach the upper end of the retaining means. They then tumble down the upper end 70 of the inwardly inclined retainer means, through the opening 102 in the frame wall 100 and onto the endless conveyor 94 of the reversible conveyor. Should rocks or some roots be wedged between the ribs 56 of the wheel or should mud or other material cling to the wheel 38, the stripper wheels 74 will force them clear of the wheel ribs 56 onto the reversible conveyor 22.

While not illustrated, the stripper wheel 74 could be powered by a hydraulic or similar motor to further insure that wedged rocks or foreign materials are dislodged from between the ribs.

Normally, the reversible conveyor 22 will be in the extended operating position shown in FIG. 3 and the transfer truck moving along beneath the conveyor outer end. However, should the truck become filled and no replacement be available, the harvester need not stop since the harvested roots can be conveyed inwardly and deposited into the storage tank 24. When an empty truck does finally arrive, the stored beets can be conveyed out the tank opening 112 to the lateral extending second conveyor means 18 and again elevated to the reversible conveyor 22 for subsequent deposit in the empty truck.

I claim

1. A root crop harvester comprising: a mobile frame; root digging means secured across the forward end of the frame; first conveyor means carried by the frame rearwardly of the digging means for receiving roots from the digging means and conveying the same upwardly and rearwardly; second conveyor means carried by the frame for receiving roots from the first conveyor means and moving the same transversely; annular elevator means supported on the frame and disposed for rotation about a horizontal axis, the interior lowermost portion thereof passing in root-receiving relationship to the second conveyor means, said elevator means including a root elevating wheel having a plurality of endless ribs, each rib forming a ring with said rings coaxially disposed in horizontally spaced apart parallel vertical planes, and a plurality of root conveying basket means peripherally spaced and interiorally affixed to said ribs; stripping means for ejecting roots and foreign material from between the rib rings of the annular elevator means including a stripping means support structure carried by the frame and disposed adjacent the upper portion of the root elevating wheel, a shaft carried by the support structure axially parallel with the elevator means axis of rotation, and spaced radially outwardly therefrom, a plurality of stripper wheels rotatably carried by the shaft and disposed to project between the rib rings of the root elevating wheel; and a conveyor means supported on the frame and disposed in underlying and root-receiving relationship to the upper portion of the annular elevator means for receiving elevated roots therefrom and for moving the same transversely to a deposit area.

2. The invention defined in claim 1 wherein the wheels adapted to be driven.

3. A root crop harvester comprising: a mobile frame; root digging means secured across the forward end of the frame; first conveyor means carried by the frame rearwardly of the digging means for receiving roots from the digging means and conveying the same upwardly and rearwardly; second conveyor means carried by the frame for receiving roots from the first conveyor means and moving the same transversely; annular elevator means supported on the frame and disposed for rotation about a horizontal axis, the interior lowermost portion thereof passing in root-receiving relationship to the second conveyor means, said elevator means including a root elevating wheel having a plurality of endless ribs, each rib forming a ring, with said rings coaxially disposed in horizontally spaced apart parallel vertical planes, and a plurality of root conveying basket means peripherally spaced and interiorally affixed to said ribs; stripper means for ejecting roots and foreign material from the annular elevator including a fore-and-aft extending horizontal stripper means support member having downwardly extending portions adjacent each side of the root elevating wheel, said member pivotally connected at its forward end with the harvester frame and yieldably connected for limited movement at its rearwardly end away from said annular elevator means axis of rotation; a transverse shaft carried by the support member axially parallel with the elevating wheel axis of rotation and outwardly spaced from said rings; a plurality of cleaning disks rotatably supported by the shaft, each disk disposed to project between adjacent rings of the elevating wheel; and a conveyor means supported on the frame and disposed in underlying and root-receiving relationship to the upper portion of the annular elevator means for receiving elevated roots therefrom and for moving the same transversely to a deposit area.

4. The invention defined in claim 3 wherein the cleaning disks are adapted to be driven.

5. The invention defined in claim 3 wherein the cleaning disks are comprised of a resilient.

6. A root crop harvester comprising: a mobile frame; root digging means secured across the forward end of the frame; first conveyor means carried by the frame rearwardly of the digging means for receiving roots from the digging means and conveying the same upwardly and rearwardly; second conveyor means carried by the frame for receiving roots from the first conveyor means and moving the same transversely; annular elevator means supported on the frame and disposed for rotation about a horizontal axis, the interior lowermost portion thereof passing in root-receiving relationship to the second conveyor means, said elevator means including a root elevating wheel having a plurality of endless ribs, each rib forming a ring with said rings coaxially disposed in horizontally spaced apart parallel vertical planes, and a plurality of root conveying basket means peripherally spaced and interiorally affixed to said ribs; a frame carried biasing means; stripping means for ejecting roots and foreign material from between the rib rings of the annular upper portion of the elevator means including support members adjacent each side of the upper portion of the root elevating wheel, said members pivotally connected with the frame at their forward end and urged downwardly at their respective rearwardly ends by the biasing means, a shaft carried by the support member axially parallel with the axis of rotation of the elevator means and spaced radially outwardly therefrom, a plurality of stripper wheels rotatably carried by the shaft and disposed to project between the rib rings of the root elevating wheel; and a conveyor means supported on the frame and disposed in underlying and root-receiving relationship to the upper portion of the annular elevator means for receiving elevated roots therefrom and for moving the same transversely to a deposit area.

7. The invention defined in claim 6 wherein swinging movement of the support members about the pivotal connection is limited by stop means.

8. A root crop harvester comprising: a mobile frame; root digging means secured across the forward end of the frame; first conveyor means carried by the frame rearwardly of the digging means for receiving roots from the digging means and conveying the same upwardly and rearwardly; second conveyor means carried by the frame for receiving roots from the first conveyor means and moving the same transversely; annular elevator means supported on the frame and disposed for rotation about a horizontal axis, the interior lowermost portion thereof passing in root-receiving relationship to the second conveyor means, said elevator means including a root elevating wheel having a plurality of endless ribs, each rib forming a ring, with said rings coaxially disposed in horizontally spaced apart parallel vertical planes, and a plurality of root conveying basket means peripherally spaced and interiorally affixed to said ribs; stripper means for ejecting roots and foreign material from the annular elevator including a fore-and-aft extending horizontal stripper means support member having downwardly extending portions adjacent each side of the root elevating wheel, said member pivotally connected at its forward end with the harvester frame, a hollow cylindrical member between the support member and frame; a helical spring internal to the cylinder, one end of said spring secured to the support member and the other end secured to said frame, said spring permitting limited movement of the member at its rearwardly end away from said annular elevator means axis of rotation; a transverse shaft carried by the support members axially parallel with the elevating wheel axis of rotation and outwardly spaced from said wheel's upper portion; a plurality of cleaning disks rotatably supported by the shaft, each disk disposed to project between adjacent rings of the elevating wheel; and a conveyor means supported on the frame and disposed in underlying and root-receiving relationship to the upper portion of the annular elevator means for receiving elevated roots therefrom and for moving the same transversely to a deposit area.

\* \* \* \* \*

UNITED STATES PATENT OFFICE
CERTIFICATE OF CORRECTION

Patent No. 4,044,837    Dated 30 August 1977

Inventor(s) Virgil Dean Haverdink

It is certified that error appears in the above-identified patent and that said Letters Patent are hereby corrected as shown below:

Column 6, line 26, after "resilient" insert --material--.

Signed and Sealed this

Ninth Day of May 1978

[SEAL]

Attest:

RUTH C. MASON
Attesting Officer

LUTRELLE F. PARKER
Acting Commissioner of Patents and Trademarks